US012456154B2

(12) United States Patent
Kozikowski et al.

(10) Patent No.: US 12,456,154 B2
(45) Date of Patent: Oct. 28, 2025

(54) AUTOMATED PROPERTY INSPECTIONS

(71) Applicant: TensorFlight Poland sp. z o. o., Białystok (PL)

(72) Inventors: Robert Kozikowski, Warsaw (PL); Zbigniew Wojna, London (GB); Lukasz Jocz, Warsaw (PL); Rafal Tybor, Cracow (PL); Wladyslaw Surala, Warsaw (PL); Piotr Jarosz, Warsaw (PL)

(73) Assignee: TENSORFLIGHT POLAND SP. Z O. O., Bialystok (PL)

( * ) Notice: Subject to any disclaimer, the term of this patent is extended or adjusted under 35 U.S.C. 154(b) by 301 days.

(21) Appl. No.: 17/719,212

(22) Filed: Apr. 12, 2022

(65) Prior Publication Data
US 2022/0383436 A1 Dec. 1, 2022

Related U.S. Application Data

(63) Continuation-in-part of application No. 16/924,588, filed on Jul. 9, 2020, now Pat. No. 11,302,034.

(51) Int. Cl.
*G06Q 50/163* (2024.01)
*G06Q 40/08* (2012.01)

(52) U.S. Cl.
CPC .......... *G06Q 50/163* (2013.01); *G06Q 40/08* (2013.01)

(58) Field of Classification Search
CPC ................... G06T 7/97; G06T 7/0004; G06T 2207/10012; G06T 2207/20081; G06T 2207/30184; G06Q 40/08
See application file for complete search history.

(56) References Cited

U.S. PATENT DOCUMENTS

| | | | | |
|---|---|---|---|---|
| 8,902,226 B2* | 12/2014 | Meadow | ................ | G06F 16/50 345/419 |
| 9,536,148 B2* | 1/2017 | Gross | .................... | G06Q 50/16 |
| 10,078,866 B1* | 9/2018 | Eraker | ............... | G06Q 30/0643 |
| 10,410,413 B2* | 9/2019 | Upendran | ............... | G06T 19/20 |
| 10,540,577 B2 | 1/2020 | Taylor et al. | | |
| 10,552,913 B1* | 2/2020 | Brandmaier | ............ | G06F 16/51 |
| 10,984,489 B1* | 4/2021 | Bruce | .................... | G06Q 50/16 |
| 11,093,982 B1* | 8/2021 | Humphries | ........ | G06Q 30/0278 |
| 11,100,704 B2* | 8/2021 | Mishra | .................... | G06F 30/13 |
| 2009/0171980 A1* | 7/2009 | Meadow | ................ | G06F 16/51 |

(Continued)

*Primary Examiner* — Bobbak Safaipour
(74) *Attorney, Agent, or Firm* — Ruggiero McAllister & McMahon LLC

(57) ABSTRACT

A property inspection service hosted on a web-based server system. The server system receives a list of physical addresses each corresponding to different parcels. For each address, the server system obtains multiple images including overhead images and perspective view images. A first trained model analyzes selected overhead images individually to identify one or more building structures. A second trained model analyzes selected perspective view images individually to identify a primary building structure. A third trained model analyzes the selected overhead images and the perspective view images together in an integrated approach to identify attributes associated with identified building structure. A digital report is generated as a graphical user interface configured to display the selected images and the attributes associated the identified building structure.

19 Claims, 14 Drawing Sheets

(56) References Cited

U.S. PATENT DOCUMENTS

| | | | |
|---|---|---|---|
| 2009/0265193 A1* | 10/2009 | Collins | G06Q 30/0185 |
| | | | 901/46 |
| 2010/0085350 A1* | 4/2010 | Mishra | G06T 15/00 |
| | | | 345/419 |
| 2013/0191252 A1* | 7/2013 | Meadow | G06F 16/78 |
| | | | 705/26.64 |
| 2013/0191292 A1* | 7/2013 | Meadow | H04N 5/28 |
| | | | 705/306 |
| 2014/0019302 A1* | 1/2014 | Meadow | G06Q 30/0623 |
| | | | 705/26.61 |
| 2015/0029182 A1 | 1/2015 | Sun et al. | |
| 2015/0213315 A1* | 7/2015 | Gross | G06T 5/50 |
| | | | 382/159 |
| 2015/0227893 A1* | 8/2015 | Huynh | G06Q 10/10 |
| | | | 705/4 |
| 2016/0314546 A1* | 10/2016 | Malnati | H04W 4/021 |
| 2018/0225870 A1* | 8/2018 | Upendran | G06T 17/05 |
| 2019/0156570 A1* | 5/2019 | Sanjurjo | G06T 19/003 |
| 2019/0251352 A1* | 8/2019 | Hovden | G06T 3/153 |
| 2020/0143212 A1 | 5/2020 | Okazaki | |
| 2020/0258285 A1* | 8/2020 | Dempsey | G06T 15/20 |
| 2020/0302630 A1* | 9/2020 | Spader | G06T 1/0007 |
| 2020/0309541 A1 | 10/2020 | Lavy et al. | |
| 2020/0410278 A1* | 12/2020 | Nelson | G06F 18/22 |
| 2021/0027528 A1* | 1/2021 | Labrie | G06T 17/00 |
| 2021/0158609 A1 | 5/2021 | Raskob et al. | |
| 2021/0232988 A1* | 7/2021 | Thornberry | G06Q 50/08 |
| 2021/0248419 A1* | 8/2021 | Cumming | G06N 3/045 |
| 2022/0292619 A1* | 9/2022 | Kozikowski | G06Q 50/163 |
| 2023/0060097 A1* | 2/2023 | Knuffman | G06N 3/045 |
| 2023/0118181 A1* | 4/2023 | Matowitz | G06T 7/254 |
| | | | 348/144 |
| 2023/0237599 A1* | 7/2023 | Maehler | G06Q 50/16 |
| | | | 705/313 |
| 2025/0037401 A1 | 1/2025 | Murali et al. | |

* cited by examiner

| Object Type | Output | Explanation |
|---|---|---|
| Object Type | Output | Explanation |
| Building Footprint | polygon | footprint of building structure |
| Tree | bounding box | poses risk of falling on house or catching fire |
| Solar Panel | polygon | group of solar panels |
| Pool | polygon | swimming pool |
| Wall | polygon | Building wall |
| building – primary | Polygon | Main structure |
| building – other | Polygon | Secondary structures |
| floor baseline | Line | FEMA guideline |
| roof | polygon | Roof |
| door | rectangle | door |
| building text | Alphanumeric | Signage or street address |

Fig. 5

| Attribute | Format | Description |
|---|---|---|
| URL | Text | Access link (URL) to the property imagery |
| Street Address | Text | Full address of the property |
| Latitude and Longitude | Number | Latitude and Longitude of building centroid |
| Building Footprint | Text | Latitude and Longitude of each building corner (GeoJSON) |
| Building Footprint | Number | Defined by the perimeter of the building plan |
| Construction Type | Text | Construction material of main beating element of the building: Reinforced Concrete / Masonry / Steel / Wood Frame |
| RMS Construction Code | Number | 3A - RCMRF with Shear Walls<br>2B - Unreinforced Masonry<br>4A – Steel Frame<br>1 – Wood Frame |
| ATC Construction Code | Number | 5 - Reinforced Concrete Shear Wall (with Frame)<br>3 - Unreinforced Masonry (Bearing Wall)<br>9 - Braced Steel Frame<br>1 - Wood Frame |
| Building Square Footage | Number | Footprint Area × Number of Stories. |
| Building Replacement Cost | Number | |
| Roof Geometry | Text | Predominant shape of the building roof:<br>Hip / Flat / Gable / Gambrel / Mansard / Pyramid / Shed / Complex |
| Roof Pitch | Text | The amount of rise compared to horizontal measurement<br>Flat (<5°) / Low (5-18.5°) / Moderate (18.5-45°) / Steep (>45°) |
| RMS/ATC Roof Geometry | Number | 0 - Unknown<br>1 - Flat roof with parapets<br>3 - Hip roof with slope less than 6:12 (26.5°)<br>4 - Hip roof with slope greater than 6:12 (26.5°)<br>5 - Gable roof with slope less than or equal to 6:12 (26.5°)<br>6 - Gable roof with slope greater than 6:12 (26.5°)<br>7 - Braced gable roof with slope less than or equal to 6:12 (26.5°)<br>8 - Braced gable roof with slope greater than 6:12 (26.5°) |
| Facade Condition | Text | Categorized by analysis of relevant risk factors:<br>Poor / Fair / Good |
| Roof Condition | Text | Categorized by analysis of relevant risk factors:<br>Poor / Fair / Good |
| Occupancy Types | Text | Categorizing structures based on their usage:<br>114 categories. RMS/, ISO mapping available |

Fig. 6

AUTOMATED PROPERTY INSPECTIONS

TECHNICAL FIELD

This disclosure relates to techniques for using different perspective images for modeling and analyzing selected real properties for various purposes, such as underwriting, risk modeling, and claims on the properties.

BACKGROUND

Insurance or reinsurance for a commercial property is based on the value of the property including building structures and other relevant features, and the risks associated with the various attributes or characteristics of the building(s) and the property features. In general, there are four basic characteristics that an underwriter considers in performing a risk evaluation, namely, construction, occupancy, protection and exposure (COPE). Other attributes and/or characteristics of the commercial property can also be identified and evaluated as part of the risk analysis.

The most basic element of a building is its construction, including the materials from which a building structure is made. Many insurers classify commercial buildings into categories based on their construction type. Each classification reflects both the building materials used (such as wood or concrete) and the combustibility and damageability of the materials used for major structural features. For example, a system developed by the Insurance Services Office (ISO) includes six building construction classifications: frame; joisted masonry; noncombustible; masonry noncombustible; modified fire resistive; and fire resistive.

Occupancy describes the purpose for which the property is used, such as retail food market, furniture manufacturing, and apartments, to name a few, as well as how the insured manages the hazards associated with what they do. Protection means the methods used to safeguard a building from fire and other perils, including both public and private protection. Exposure refers to external hazards that exist largely due to the building's location. Some hazards are natural. A building located in a breezy area may be subject to damage by high winds. Other natural hazards include sinkholes, hail, lightning, and heavy snow. Natural hazards can vary widely from one location to another.

One conventional method for collecting relevant data is to conduct "in place" inspections, where a representative of the insurer (or the underwriter) visits the property and makes a visual assessment of the relevant property attributes. Another approach is to manually review photographs of the property and its buildings on publicly available websites. A more recent approach is to obtain satellite data and construct algorithms to evaluate the satellite images and extract relevant data.

However, it is important when valuing a policy that the data relied upon is valid and current. Mistakes arise from the use of unreliable or outdated data sources, with errors appearing either in the manual input of data or from inaccurate information obtained from brokers, agents, or property owners. As a result, errors in the classification of properties can lead to a lower valuation thereby generating less in premium payments, i.e., premium leakage, a lost opportunity for insurers. An analysis by Verisk Analytics, Inc. estimated the premiums leakage due to misclassification at $4.5 billion annually. Further, the same Verisk analysis concluded that commercial real estate was wrongly classified by construction type in 32.5% of the cases studied, and the building area was incorrectly estimated in 80% of the cases studied. These problems can lead to significant undervaluing or overvaluing of insurance premiums for commercial properties.

Therefore, there is a need for improved techniques for collecting reliable, precise and current attribute data for commercial properties in order to accurate value the properties for the purpose of insurance or reinsurance coverage on the properties.

BRIEF DESCRIPTION OF THE DRAWINGS

FIG. 5 is a chart listing example object types, the corresponding output type representations, and the explanations of the object types.

FIG. 6 is a chart listing examples of attributes associated with objects.

DETAILED DESCRIPTION

The following disclosure is directed to systems and methods for providing fully automated real property inspections in near-real time. In an embodiment, upon receiving a list of addresses from a user, multiple images are obtained of buildings and/or structures on the real property parcel(s) that correspond to each of the listed addresses, including at least two different perspective views of each building of interest among the images. For example, an overhead view is analyzed with a first computer-based model that is configured and has been trained to identify buildings or other significant structures or objects from an overhead perspective. A different perspective view, such as a ground-level (street) view or an oblique angle view (e.g., 45°), is analyzed with a second computer-based model that is configured and has been trained to identify the building structures and/or other objects identified with the first model from the alternative perspective. A third computer-based model evaluates the different views together using an integrated approach that predicts the attributes associated with the identified objects, such as number of stories in the building. By using image recognition technology to evaluate the building structure(s) on each parcel from multiple view perspectives, better valuation estimates result leading to more competitive and accurate premium assessments.

Figure 1:
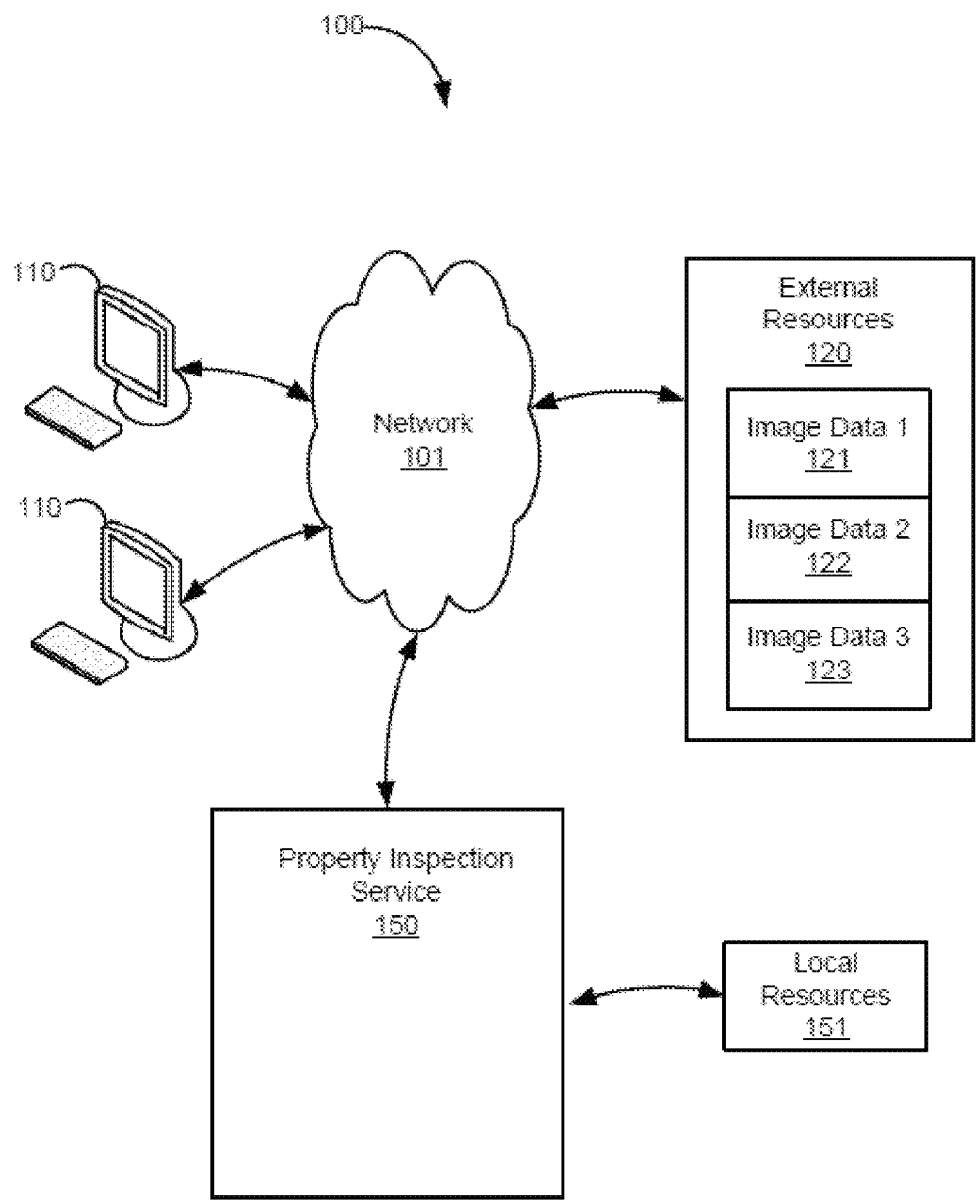
FIG. 1 is block diagram illustrating a basic system for automatically generating a commercial property inspection.

FIG. 1 is a block diagram illustrating a simplified system 100 for generating an automated property inspection report for commercial properties. The system 100 is merely exemplary and is intended to illustrate how various features may be implemented among various components in one embodiment.

The system 100 includes exemplary client systems 110a and 110b, each of which is associated with a different user. Each client system 110a, 110b is a computer-based device, such as a desktop computer, laptop computer, mobile computing device, etc., operated under the control of the user, and configured with an application that allows the client device to be connected to a property inspection service 150 through a communication network 101, such as the Internet. The different users of client systems 110a, 110b may have different roles and access rules within system 100, as further described below.

The property inspection service 150 is hosted on one or more web-based servers and is configured to communicate with users through a conventional web browser, as well as to communicate with local resources 151 and external resources 120 as necessary to support the processing operations of the property inspection service. The servers hosting the property inspection service 150 are programmed with various routines to manage and direct the receipt and handling of input data from the client systems 110a, 110b, the processing and analysis of the input data, and the generation of a useful digital display of property features for return to the customer.

The external resources 120 are utilized to obtain data and perform a variety of relevant tasks. For example, external resources 120 are used to obtain images from different view perspectives for each parcel, to provide access to additional processing resources, such as deep learning algorithms and computer vision technology, and to evaluate the images in order to extract the features of interest to the insurer and underwriter. In fact, as described herein, the use of multiple images having different view perspectives of the property of interest enhances the accuracy of the determinations made by the system. For example, a first set of images of each property can be obtained from an image data source 121, such as overhead images from aerial or satellite sources; a second set of images can be obtained from image data source 122, such as ground level or street view images; and a third set of images can be obtained from image data source 123, such as oblique views. Each of these images provides a different perspective view of the subject property, enabling a more comprehensive analysis of the property through image recognition and analysis of the multiple images, both individually and collectively. In addition to the imagery, the external resources may provide useful location data 125, such as parcel information, property appraisals, external geocoding services, address databases, etc.

Figure 2:
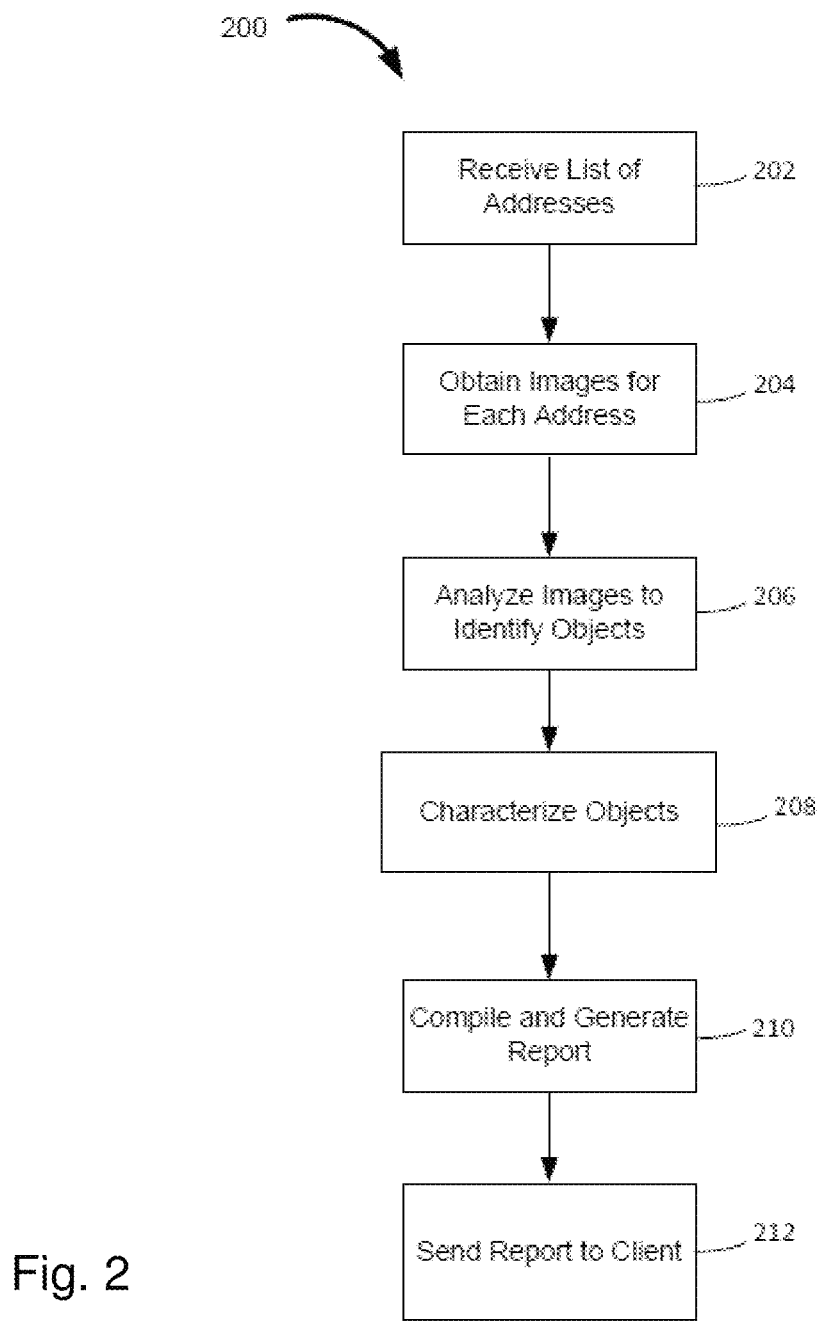
FIG. 2 is a flow chart illustrating a basic process for automatically generating a commercial property inspection.

Referring now to FIG. 2, a simplified process 200 for providing a property inspection report using system 101 is illustrated. In step 202, the property inspection service receives one or more physical property addresses from a client system, such as a list of addresses from a user who requests detailed property inspection reports in order to provide insurance or reinsurance estimates to customers, namely property owner(s). In step 204, the property inspection service obtains images for each physical property address from one or more external sources, including preferably images from at least two different perspective views of the property. For example, overhead images such as aerial images and satellite images may be obtained from third-party vendors such as Bing, Nearmap, Digital Globe and others, while ground level or street view images may be obtained from Bing, Mapillary, MLS listings, business websites and others. Various images may also be obtained from other sources, such as the crowd-sourced website www.openstreetcam.org or similar efforts, and government-sponsored websites.

In step 206, selected images in a first set of data files (overhead view perspective) are analyzed in order to identify the major objects on the property, which may be buildings, trees, and other significant man-made structures or natural features. In one embodiment, all of the image files are individually analyzed in order to select and utilize different view perspectives useful for extracting particular objects on the property as well as features and details associated with the objects. For example, overhead views are most useful for identifying individual major objects such as building structures and other significant features. In some embodiments, a three-dimensional model can be created from the different perspective view images to represent elevation and surface definition information for building structures and other features and attributes of the target real property parcel(s).

In step 207, selected images in a second set of data files (ground level view) are analyzed in order to identify and evaluate attributes and characteristics of the objects identified in step 206, for example, number of stories of the building, windows in the building, roof of the building, trees outside of the building, etc. For this step, a ground level view or an oblique view is useful to characterize the objects. Additional images including other view perspectives may be obtained and used as necessary or desired to both enhance the accuracy of the analytical techniques and to continually train the machine-learning models used to perform the analyses on new image data.

In step 208, the first set of images and the second set of images are considered and evaluated together in an integrated analysis that serves to confirm and clarify details of the analysis performed in steps 206 and 207.

As noted above, the image analysis steps are performed using one or more specialized computer-implemented models that have been developed to identify and characterize objects and related attributes through computer vision and machine learning techniques, and the models have been trained on sample data sets, as will be discussed in more detail below.

In step 210, a report is compiled and generated as part of a graphical user interface for display on a client device, including some or all of the images and a listing of some or all of the objects identified in the images and their characterizations for each physical property address. In step 212, a link to the web-based report is sent to the client. Based on the report, the client (e.g., an insurer or underwriter) can provide valuations for the list of properties to support offers of insurance or reinsurance.

A typical property inspection report will contain a listing of baseline features and additional features of the property. For example, the baseline general building features include geolocation (geographic location of building/property) and parcel number; footprint and square footage; construction type (wood frame, masonry, reinforced concrete, metal, tilt-up, other); year built (estimate); and number of stories. The accuracy of risk analysis and replacement value and/or reconstruction cost estimating is enhanced by providing any additional available data related to additional property features and attributes, such as shape, occupancy types; exterior cladding material; roof material; windows and/or skylights; and swimming pool, to name a few examples. Further, additional information, such as proximity to key environmental features, such as trees and other vegetation, fire hydrants and other emergency resources, lakes and reservoirs, and other natural and man-made hazards, can be important for evaluating risks.

Thus, the output data from the analysis of images is formatted into a user-friendly web-based report that provides a complete review of the building and its surroundings, including baseline building features and any additional property features and attributes identified as potential assets associated with the real property parcel.

Figure 3:
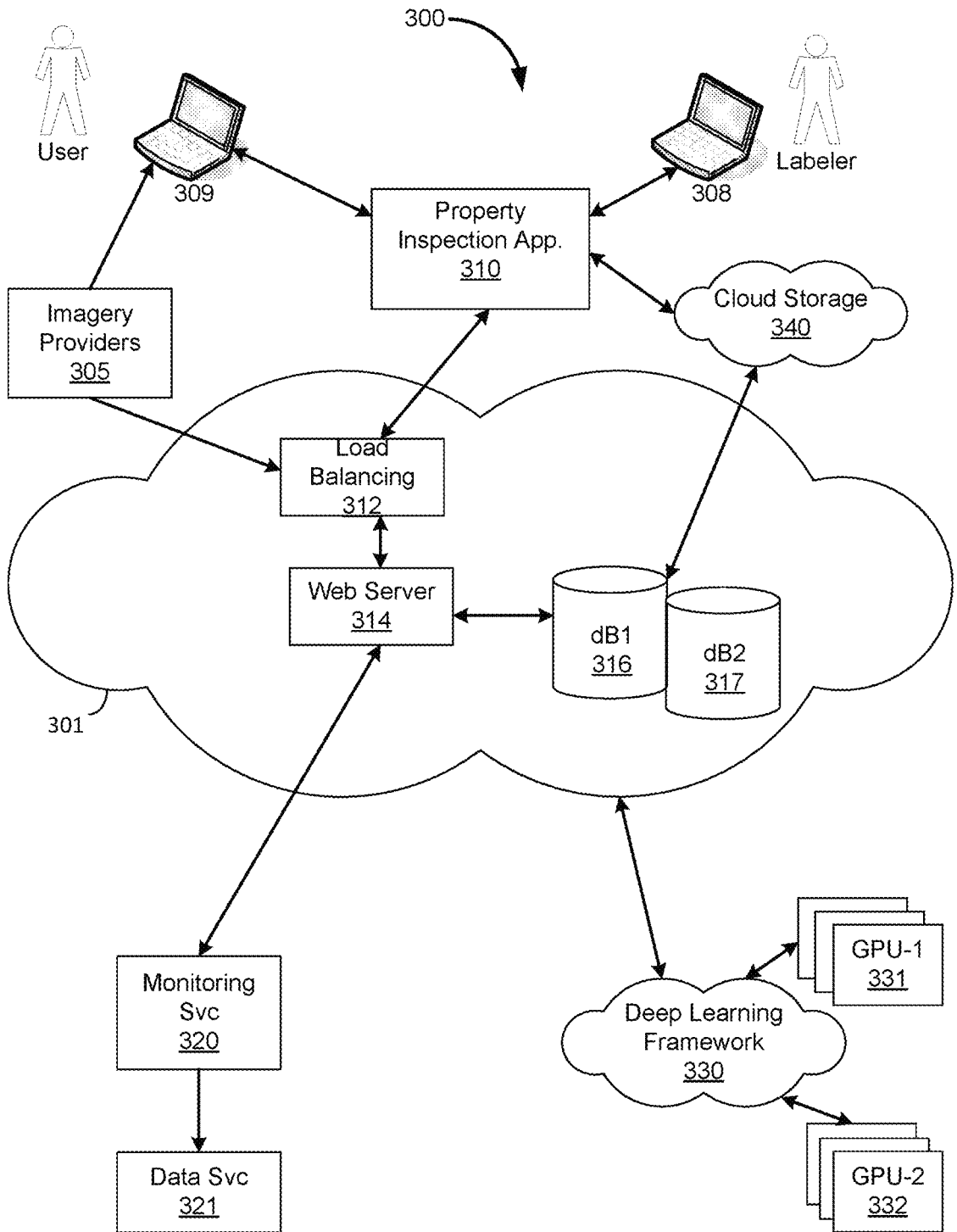
FIG. 3 is a system architectural diagram for one embodiment of a property inspection service.

FIG. 3 is a detailed architectural diagram illustrating one embodiment of a web-based system 300 for generating an automated property inspection report for commercial properties through the use of trained models that utilize machine learning and computer vision. A user, such as an agent seeking to provide an insurance or reinsurance estimate to a customer, uses a first client device 309 to run a property inspection application 310. The property inspection application 310 is preferably hosted as a web-based service; but may also be configured with a client portion installed on the client device and a web-based server portion. The property inspection application 310 is configured to interact with a web-based property inspection service 301, in order to utilize various components of the web service 301 and related resources for obtaining data for evaluating the physical property addresses provided by the user. Further, in one embodiment, the various components of web service 301 are organized with software as "containers" such that each component is isolated from other components and bundles together its own application, tools, libraries, and configuration files. Containerization is an operating system level virtualization technique originally developed by Docker, Inc.

The first cloud-based component of the web service 301 is a first server 312, which is configured to act as the front-end, load-balancing component in order to manage ingress of data from user device 309. In one example, the first web server 312 may be configured with software from Nginx, Inc. to provide an asynchronous event-driven approach to handling requests, rather than using threads, thereby providing a more predictable performance, particularly under the high loads required for most image processing tasks.

A second server 314 is configured as the main web server for hosting the web service 301 and provides a web framework for the image inspection pipeline. For example, Flask is a micro web framework written in Python that is used for detecting custom objects and building classification models on state-of-the-art deep neural networks. The web server 314 requests image data from imagery partners 305 and integrates the various images of different view perspectives, e.g., the ground view, the overhead view, and any other views (such as oblique), into a single display on a user interface for review by the user.

The web server 314 is coupled with a monitoring service 320 external to the web service 301. The monitoring service 320 provides performance and diagnostics data for web service 301, and may also utilize other data services to facilitate analysis of large datasets such as presented by the image-intensive data handled herein.

The web server 314 is also coupled with a first database 316 and a second database 317. The first database 316 is an object-relational database management system that is used for storing objects that are associated with property features, and may be implemented, for example, using the PostgreSQL database (or simply Postgres). The second database 317 provides a data structure for storing the list of features associated with each property. For example, Redis is an open-source data structure implementing a database, and useful for abstract data structures such as strings, lists, maps, etc.

Another external resource coupled to the web service 301 is a deep learning framework 330. Deep learning (also known as deep structured learning or hierarchical learning) is a type of machine learning that is based on learning data representations rather than learning task-specific algorithms. For example, PyTorch is an open-source machine learning library that provides deep neural networks that are well-suited for processing in computer vision applications. Caffe2 is an open-source deep learning framework that is geared towards image classification and image segmentation, and in the present case, is useful for classifying objects identified in the various images of a property.

Since the current application relates to image processing, which is a resource-intensive operation, the deep learning framework 330 uses multiple graphics processing units including GPUs 331, which are local to the deep learning module, and GPUs 332 for additional cloud-based processing power to perform image analysis with the trained models.

Finally, the results of image processing are stored in the first database 316 and used to generate a digital report for display as a formatted user interface. The formatted display is uploaded to the property inspection application 310 where it may be viewed or downloaded by the user 309.

The system 300 can be securely configured to limit and/or restrict access, for example, by defining and assigning roles to different users. Such restrictions are normal and customary for computer-based services. Thus, a customer of the property inspection service would likely not be granted permission to access and edit data, but instead might be restricted to uploading addresses and downloading reports. Other roles should be defined, such as administrative roles for maintaining and updating relevant databases and other resources.

A "labeler" role 308 is defined to manually annotate images and to review the automated annotations of objects and related characteristics generated by the property inspection service. The labeler 308 is an administrative user with permission to access the database 316 through application 310 to review and edit information stored with associated images.

Initially, the labeler 308 (or a similar administrative role) manually annotates test images, for example, to identify buildings from a top down view, then to identify attributes of the building from a ground level view or an oblique view. The annotated test images form the training set for a machine learning processing scheme configured to evaluate such images.

A "supervisor" role may also be defined to review the annotations of the labeler. In deployment, the property inspection service (1) ingests images for a specific property, then (2) automatically identifies objects and their attributes from the images using the machine learning based image processing scheme and generates a report; and (3) a labeler reviews some or all reports to check the identification of objects and attributes, and makes edits as necessary. In many instances, (4) a supervisor verifies the accuracy of the labeler's edits. Leanings from steps 2-4 are used as training data to update and improve the machine learning processing scheme as time and experience proceeds. The labeler and supervisor roles form part of a trained property analyst team that includes experienced building engineers and loss control engineers to verify attributes. For example, all available sources—satellite and street view images and all external sources (OSM, building permits and other databases) are analyzed in order to verify attributes and improve the training datasets. Further, the predictive model can be configured to return a confidence value, where high confidence values are associated with results that are more likely to be true. Low confidence values are harder examples for the model to process, and will be reviewed by the property analyst team for addition to the training sets.

Figure 4A:
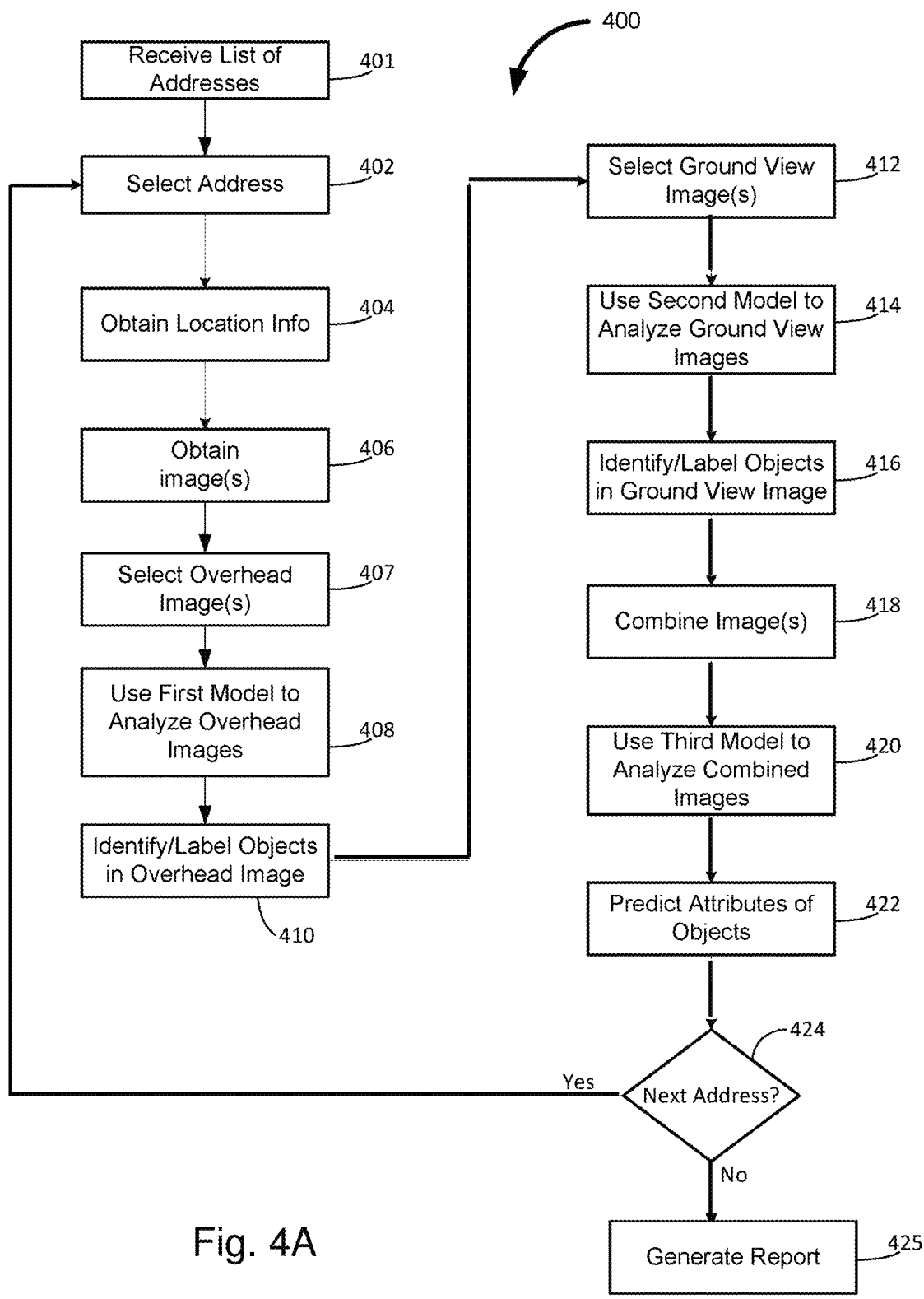
FIG. 4A is a flow chart illustrating a detailed process for automatically generating a commercial property inspection.

Referring to FIG. 4A, a more detailed process 400 for providing a digital property inspection report according to one embodiment is illustrated.

In step 401, the property inspection service receives an address, or more typically, a list of addresses from a user. In step 402, the service selects a first address from the list of physical addresses provided by the user. In step 404, information including location information corresponding to the first parcel in the list of physical addresses is obtained. For example, GPS coordinates associated with the physical address are typically readily available from different commercial information sources. Additional location and relevant property information may be obtained from government resources, such as real property parcel databases having appraisals and other information, or open datasets such as OpenStreetMap or OpenAddresses.

Once the geolocation is known, in step 406, a first set of images is obtained using the GPS coordinates. These images include overhead images, such as a satellite image or an aerial image, but may also include images taken from a different perspective relative to the location. For example, there may be photographs taken from airplanes, helicopters, drones, tops of tall buildings, etc., that correspond to the geolocation and which provide an accurate depiction of the location from an overhead and/or oblique angle. Oblique images may be extremely useful for extracting features but is also the most expensive of the imagery sources. Ground view or street view images are also included. Current images may be obtained in real-time from third-party vendors, or images may be stored in local storage or remote storage and retrieved as necessary.

In step 407, one or more overhead images of the parcel are selected from the first set of images. In step 408, the selected overhead image is analyzed to identify and characterize major object items, such as one or more building structures at the location, and to identify other objects of the property that are apparent from a top-down view, such as trees adjacent to the building structure(s). In step 410, the objects are identified and labeled. The analysis and marking of the images in steps 408/410 is performed using a first model that is constructed as a neural network to implement computer vision algorithms for the purpose of identifying major objects from a view perspective that is above the location. The first model is developed and trained using one or more test sets of training data. For example, a labeler manually annotates one or more sample aerial images to identify building footprints by drawing a polygon that defines the perimeter of the building, and the first model is trained with the sample annotated images using computer vision techniques and machine learning techniques. The building footprint is the most important object derived from the aerial view, but other objects are also identified and annotated to help train the first model, for example, by drawing a polygon or a bounding box around the object.

Figure 4B:
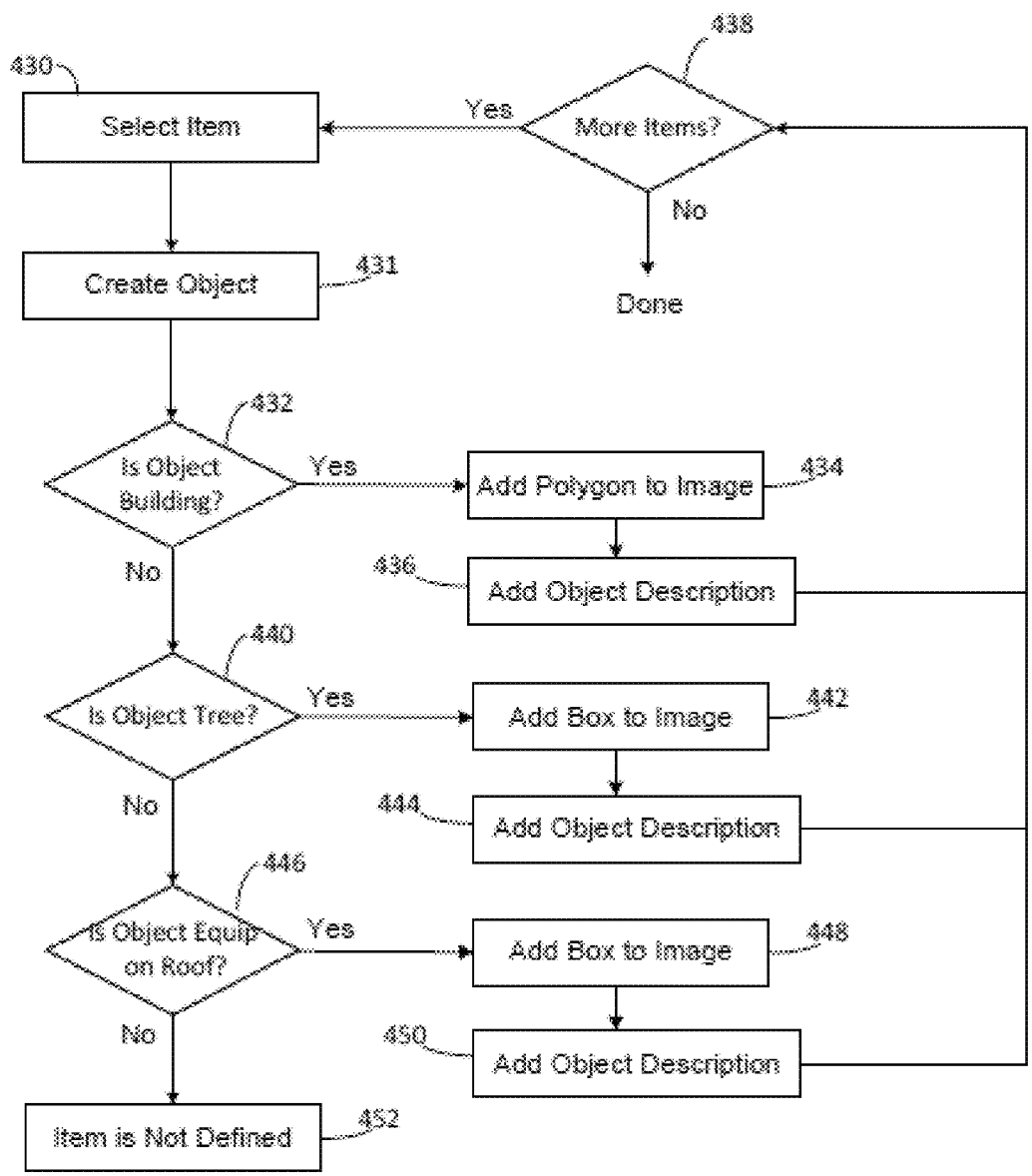
FIG. 4B is a flow chart illustrating a portion of the process of FIG. 4A utilizing a first trained model.

FIG. 4B illustrates one method for implementing steps 408/410 using the first model. In step 430, an item in the overhead view is selected, and in step 431, a data object is created to identify and characterize the item. If the first model interprets the item as a building structure in step 432, then a polygon is added to the aerial view image in step 434 to indicate the perimeter of the building structure, and a description of the item from the first model is stored with the data object in step 436. If there are more items to select and characterize in step 438, then the process returns to step 430 to select and evaluate another item in the overhead view. If not, the routine ends.

If the first model did not interpret the item as a building in step 432, then the first model considers whether the item is a tree in step 440. If so, then in step 442, a bounding box is added to the overhead view image around the tree, and a description of the item from the first model is stored with the data object in step 444. If there are more items to select and characterize in step 438, then the process returns to step 430 to select and evaluate another item in the aerial view. If not, the routine ends.

If the first model did not interpret the item as a tree in step 440, then the first model considers whether the item is some other defined object in step 446. If so, then in step 448, a polygon (or some bounded shape) is added to the overhead view image around the object, and a description of the item from the first model is stored with the data object in step 450. If there are more items to select and characterize in step 438, then the process returns to step 430 to select and evaluate another item in the aerial view. If not, the routine ends.

Of course, there could be many other types of items defined in the first model that are identified and stored as a data objects in the analysis step 408 of process 400, and additional similar decision trees could be implemented as in FIG. 4B. For example, the overhead view may show trees, walls, pools, solar panels and location layout. The overhead view may also show building damage, such as from fire or earthquake, or imminent risk to building structures from adjacent natural or man-made hazards.

FIG. 5 shows an exemplary table 500 useful for defining objects. A first column 502 lists a number of different object types that can be recognized and created for a particular property. The second column 504 lists the output type associated with each object type, that is, what physical icon or shape will be associated with the object. The third column 506 includes an explanation of the object. For example, the first item listed in table 500 is identified as a "building footprint" object in the first column 502, and each building footprint object is represented on the relevant image with a polygon, as indicated in the second column 504, with an explanation as indicated in the third column 506.

FIG. 6 is an exemplary table 600 for defining attributes associated with objects. A first column 602 lists a number of different attributes that can be associated with a particular building structure data object, such as street address, latitude and longitude; number of stories; etc. The second column 604 lists the output type associated with each object type, namely, a numeric value or a text value. The third column 606 includes a description of the attribute. The table 500 of defined objects and table 600 of defined attributes associated with defined objects are merely illustrative and may include other defined objects and attributes.

Returning to FIG. 4A, once the overhead image(s) are analyzed, one or more ground view images are selected for the property location in step 412. In fact, the overhead images can provide helpful perspective for choosing useful ground view images. For example, based on the location of buildings and trees, the most effective ground level perspective views for analyzing the building structures can be chosen from among multiple images.

In step 414, the ground view image is analyzed using a second model, and in step 416 objects appearing in the ground view image are identified, labeled and correlated with objects identified using the first model on overhead images. The second model evaluates ground view images of the building façade, for example, to provide information that cannot be ascertained from the overhead images, and in particular, the floor baseline. For each building, many candidate images are obtained, for example, from vendors such as Bing, Streetside and Mapillary, and from crawling external website like Yelp, MLS listings and business websites. Each candidate image is evaluated for its usefulness—is the building clearly visible, or is the view obstructed by other buildings or trees. Other factors include timeliness—was the image captured recently? It is also important to capture views of the property from different sides so that the different views may be compared to each other.

The second model is also constructed as a neural network to implement computer vision algorithms for the purpose of identifying features from the ground view perspective, in particular, identifying the primary building structure, the floor baseline, windows in the primary building structure, and the number of stories or floors in the building structure. The second model is developed using training data in the same manner as the first model. For example, a labeler manually annotates one or more sample ground view images to identify a building as the primary building structure and to draw boxes or polygons around windows on the primary building structure. The ground view images typically allow the user to view a location from multiple sides.

Figure 4C:
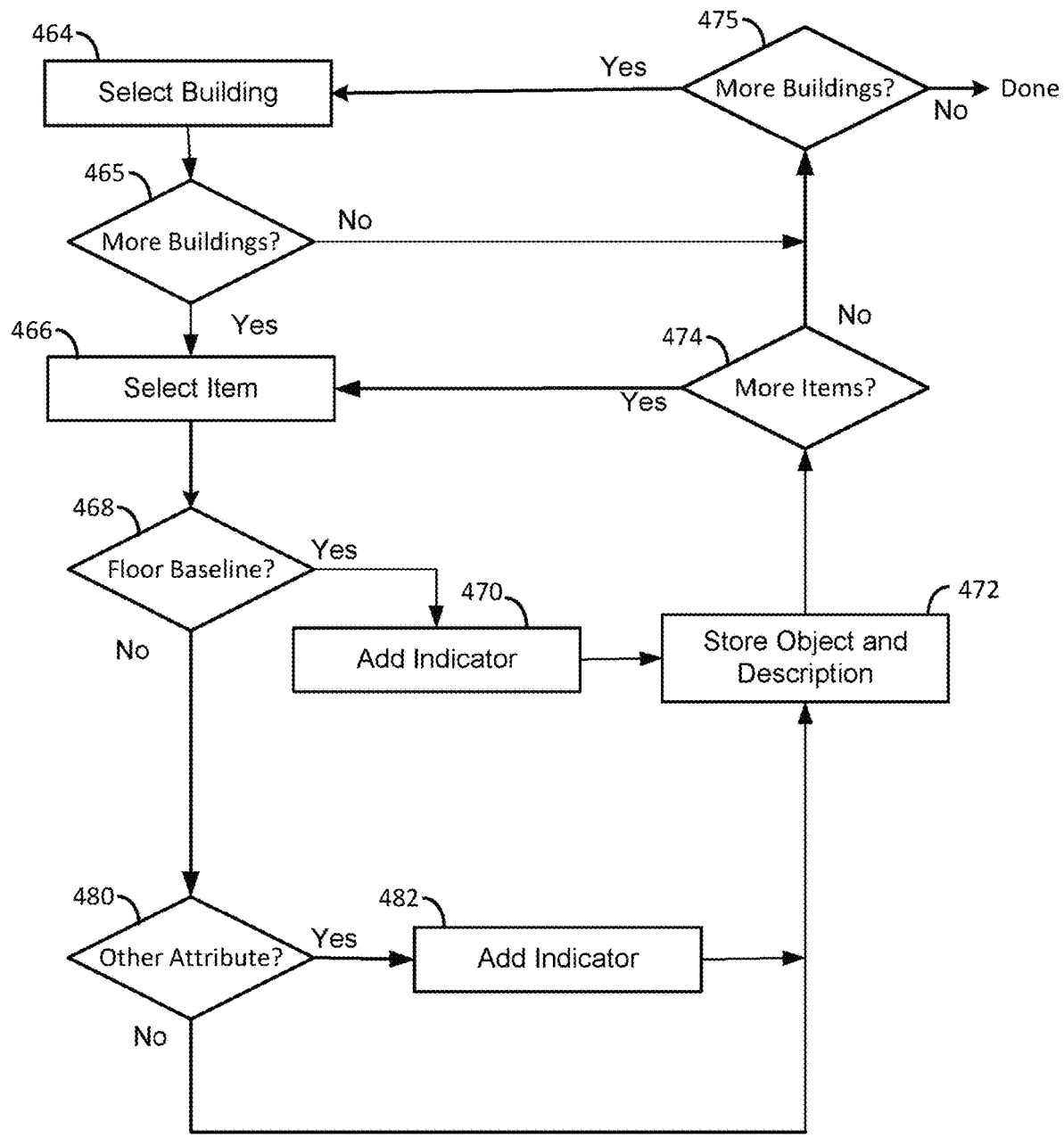
FIG. 4C is a flow chart illustrating a portion of the process of FIG. 4A utilizing a second trained model.

FIG. 4C illustrates one method for implementing steps 414/416 using the second model for each building structure identified in the overhead view.

In step 464, a building that was identified in the overhead view is selected from a ground view image. The first objective is to identify the primary building (if more than one building structure on the parcel). If analysis of the selected ground view image by the second model confirms that the identified building is the primary building in step 465, then in step 466, an attribute (item or feature) that is apparent on the primary building structure in the ground view is selected. If analysis of the selected ground view image does not confirm that the selected building is the primary building structure in step 465, then the process jumps to step 475 to see if there are additional buildings to consider and then back to step 464 to select a different building.

One of the important attributes from to extract from the ground level image is the floor baseline. For example, in the United States, the "lowest floor elevation" must be determined in order to comply with National Flood Insurance Program minimum elevation requirements. Overlapping points from the overhead view and ground view can be selected to determine the precise location of a given point, and the elevation of the given point determined in accord with FEMA guidelines. If the second model interprets the selected item on the selected building as the floor baseline, for example, in step 468, then the floor baseline is positively indicated by some means. For example, a bold line may be imposed onto the building image at the floor line in step 470, and the floor baseline item is stored as a data object along with a description from the second model in step 472.

If there are more items present in the selected ground view image in step 474 for this building object, then the routine returns to step 466 to select the next item.

If there are no more items to be selected for this building object in step 474, then if there are other building objects on the parcel to evaluate in step 475, the process returns to step 464 to select another building and repeat the analysis. If there are no more buildings to consider in step 475, the process ends.

If the second model does not interpret the item as the floor baseline in step 468, then another attribute item, such as a window, can be considered in step 480. Additional decision trees can be added for as many defined attributes as are specified. If the next attribute item is identified in the ground level image in step 480, then the item is indicated by some means in step 482, for example, bounded with a box or polygon, and the item is stored as a data object with a corresponding description in step 472. The process then returns to step 474 to see if more items are present in the ground view for this building object, as if so, the routine returns to step 466 to select the next item. If the second model does not interpret the item as the other attribute in step 480, process then returns to step 474.

Returning again to FIG. 4A, once the analysis of the ground view images is completed, the overhead image and the ground view image are considered together in step 418, and a third model is used to analyze both images with an integrated approach in step 420 in order to predict attributes that are to be associated with identified objects. In step 422, the predicted attributes are associated with corresponding objects that have been classified and labeled.

Previous steps only included singular information about a building like a satellite image or ground image. However, some building attributes require multiple views in order to make a correct assessment. For example, a building may appear to have three stories when viewed from one side, but five stories when viewed from the other side. Another example is square footage—multiple perspectives of a building are needed to correctly understand the shape of the building.

The third model not only combines multiple images, but also includes external information. For example, to determine the construction type, in addition to considering the building information, the system can obtain additional information such as building codes, local building standards, building age, building dimensions, and other relevant information. Other external data can also be considered, such as from property appraisal sites or governmental census data. As the data quality differs between each region and is typically provided by local governments (e.g., counties in the US), a trust score can be associated with each data source. Combining all this information together, the model makes a final determination of attributes such as number of stories, construction type, replacement cost, occupancy type, square footage, or building condition.

The third model is also constructed as a neural network to implement computer vision algorithms for the purpose of predicting attributes of selected objects from multiple images using an integrated approach to the images. The third model is developed using training data with sample data sets in the same manner as the first and second models. For example, a model can be trained when a labeler manually annotates one or more images to identify attributes from the combined analysis of images, such as the number of stories in a building.

Once processing of one address is complete, then the routine determines whether there are more addresses to process in step 424. If so, the process returns to step 402 to select the next address. If there are no more addresses to process in step 424, then a report is generated for the user in step 425 and the routine ends.

Figure 7:
FIG. 7 is a first user interface displaying the results of analyzing aerial images using the first trained model.

An example of the operation of process 400 will now be described. FIG. 7 shows an example of a first digital user display 700 having a first main window 701 displaying an embedded image that is an aerial view of a property location and a second window 702 displayed within the first window and listing information about the image. The aerial view is analyzed by a first trained model as described above with the primary objective of automatically identifying buildings (and/or their footprint) and other major objects on the parcel.

The aerial image in the first window 701 shows a commercial property having five buildings. The first trained model has analyzed the image to identify the first building (or its footprint) by marking the perimeter of the first building with a polygon 711; similarly, the perimeter of the second building is marked with polygon 712; the perimeter of the third building is marked with polygon 713; the perimeter of the fourth building is marked with polygon 714; and the perimeter of the fifth building is marked with polygon 715.

Many trees are also evident in the image and have been recognized and marked by the trained first model with boxes. For example, box 721 marks the tree adjacent the building 711; box 722 marks the tree adjacent the building 712; and box 723 marks the tree adjacent the building 713. Other objects may be apparent in overhead images and will be designated according to the legend included in window 702.

The pop-up window 702 in user display 700 includes information about the image and the various markings. For example, a list 705 of individual objects of interest is presented in the second window 702, and each listed object type includes a check box 706 in front of the item. The check box 706 may be selected (or deselected) to view (or remove) that object on the image. Each item in the list may also be hyperlinked so that the corresponding objects are highlighted upon selection. The listed objects in window 702 could of course include other objects of interest as specified.

Figure 8:
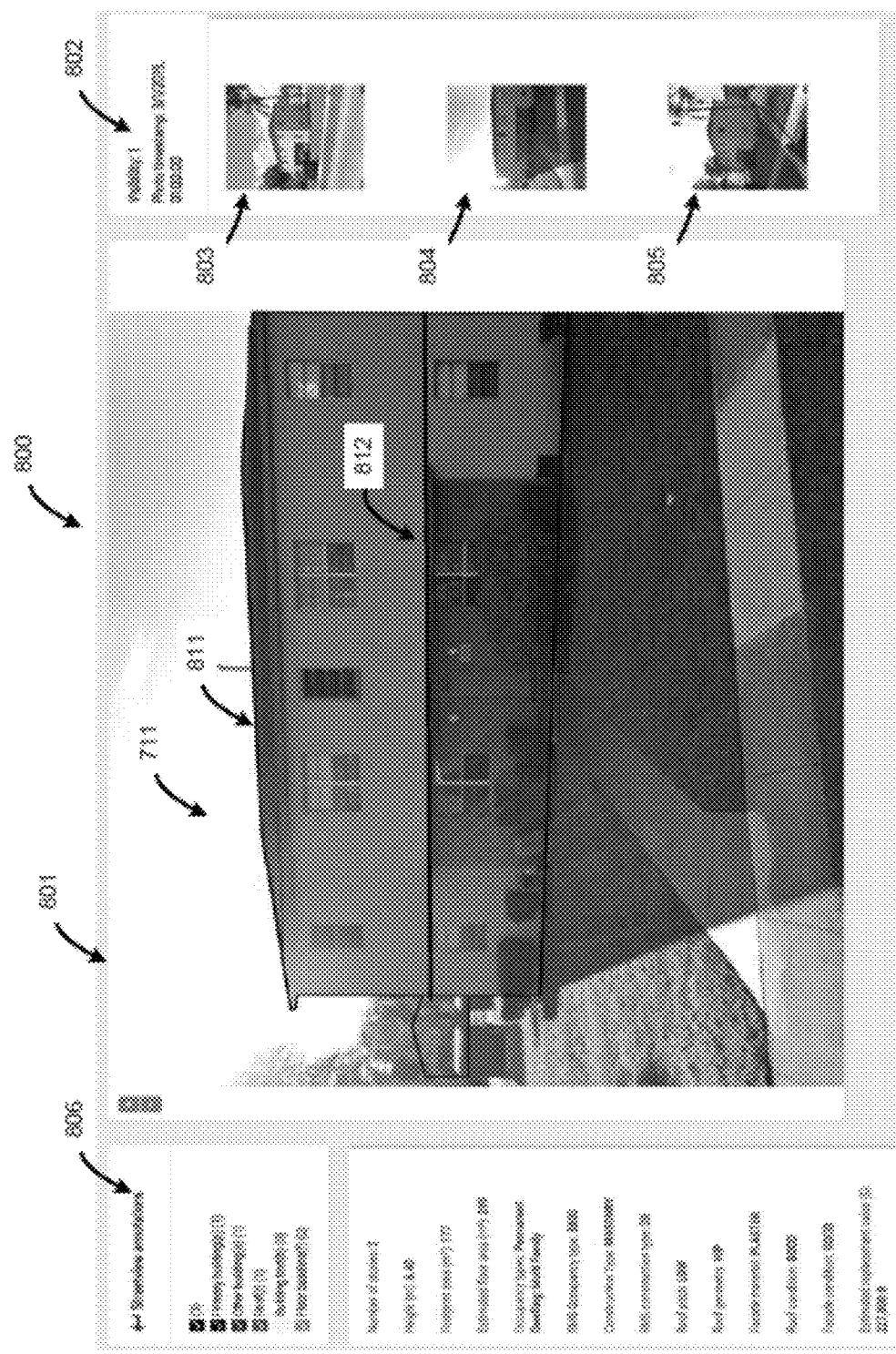
FIG. 8 is a second user interface displaying the results of analyzing street view images using the second trained model.

FIG. 8 is an example of a second user display 800 for displaying one or more different perspective views of the same property depicted in FIG. 6, and in particular, different perspective views of the main building bounded by rectangle 711 as shown in FIG. 7. In this example, the display 800 includes a first main window 801 displaying a first embedded image that is a ground level or street view of the building 711. A second window 802 is configured as a preview pane within display 800 that includes additional ground level images 803, 804, 805 of building 711. User selection of a different image in the preview pane 802 moves the selected image into the main window 801 and moves the replaced image into the preview pane. If additional images exist, the window 802 may be enabled to scroll down through the multiple images.

It is noted that street view technology typically provides interactive panoramas formed as a series of stitched images, which are accessible to users through a JavaScript application programming interface ("API"). Thus, the set of street view images selected using the methods disclosed herein may be obtained as a series of associated images of the same parcel (or preferably the identified building structure) but taken from different lateral points of view. Therefore, the multiple images 803, 804, 805 and others in the preview pane 802 can, for example, provide a ground level view of each side of building 711, further enhancing the ability of the models to recognize and characterize objects and their attributes on the subject property.

A third window 806 is configured as an information pop-up within display 800, listing information about the object in the selected street view image displayed in the main window 801. Selection of a different image into the main window 801 causes the listed information in window 806 to be updated for the selected image.

In street view image displayed in the main window 801, the first building 711 is visible and its outline is recognized and marked with a nearly-rectangular polygon 811. In addition, the two stories of building 711 are recognized and a line 812 delineates the two floors within polygon 811. The analysis of street view image(s) by a second trained model has the primary objective of also identifying the major objects, such as building 711, but can also extract additional information, including number of stories, construction type, and a list of possible occupancy types.

Figure 9:
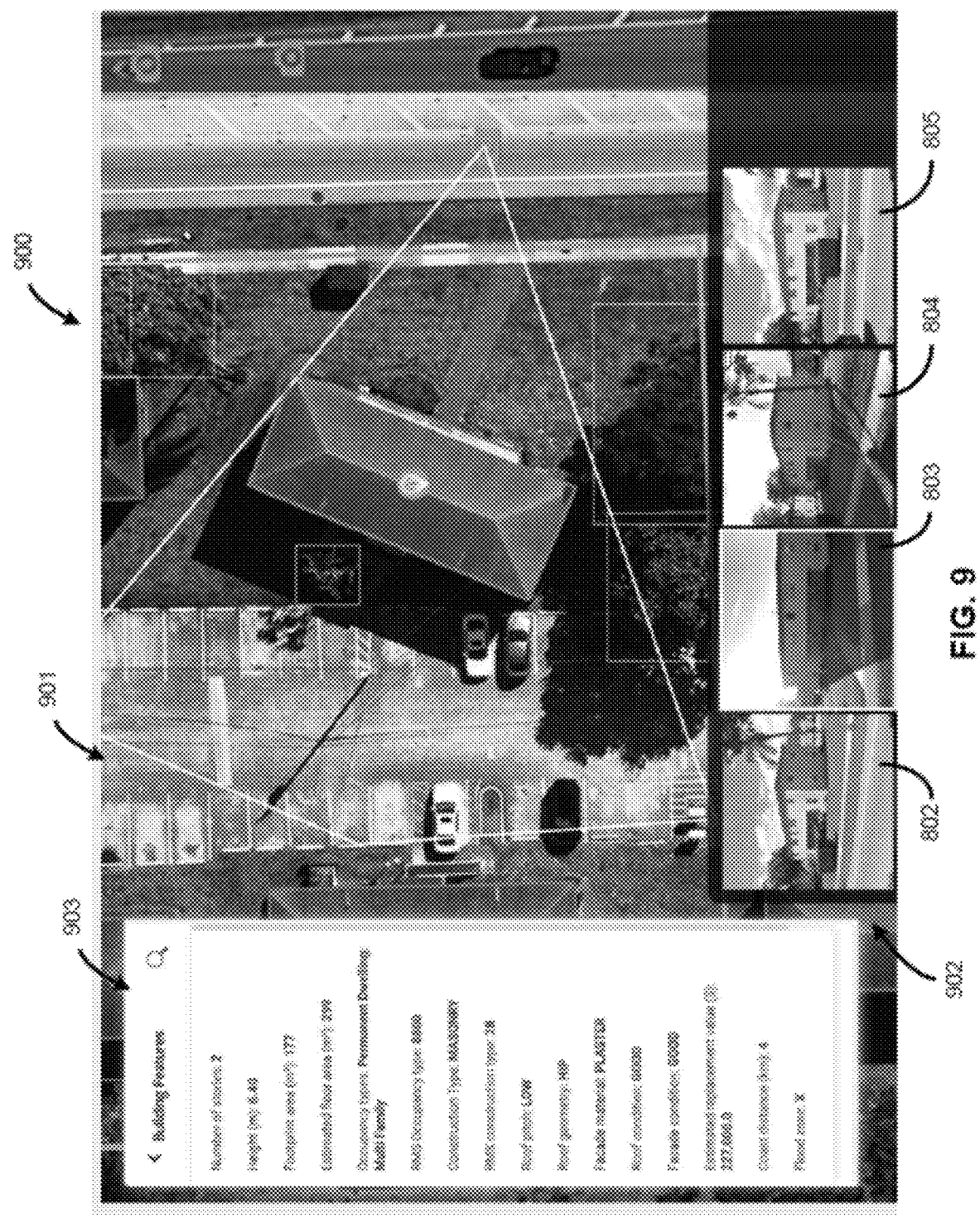
FIG. 9 is a third user interface displaying the results of analyzing both the aerial images and the street view images concurrently using a third trained model.

Finally, in FIG. 9, the aerial view and the street views are all presented in a single integrated display 900. The display 900 includes a main window 901 in which the selected view is displayed as a large image, and in this case the overhead view from FIG. 7 is selected. —A second window 902 is configured as a preview pane similar the preview pane 802 in FIG. 8, and includes the ground level views 803, 804 and 805 from FIG. 8 and an additional ground view image 806. Any of the images in the preview section can be selected for display and swap-out in the primary image display. The third trained model takes both views into consideration using an integrated approach in order to predict the features and attributes associated with objects identified on the property by the first and second models.

A third window 903 is a pop-up window within display 900 and includes a list of attributes and corresponding values is displayed in window 902 to the left of the image display areas.

Reports may be customized based on customer needs, and the system adapted based on user specifications. For example, the type and quantity of imagery to obtain will be based on needs but also usually constrained by cost. Oblique imagery can provide more information than overhead or ground level views, but is less available and more expensive. Overhead images from satellites cover most of the world and are easy and inexpensive to obtain. Ground level images are widely available in the United States but are not always current.

In general, the techniques described herein for obtaining and processing different image perspectives can be used for a number of different purposes related to the evaluation of real property parcels including structures and other valued asset objects on such parcels. In one embodiment, the techniques are used to estimate the square footage and number of stories of a building structure.

Figure 10:
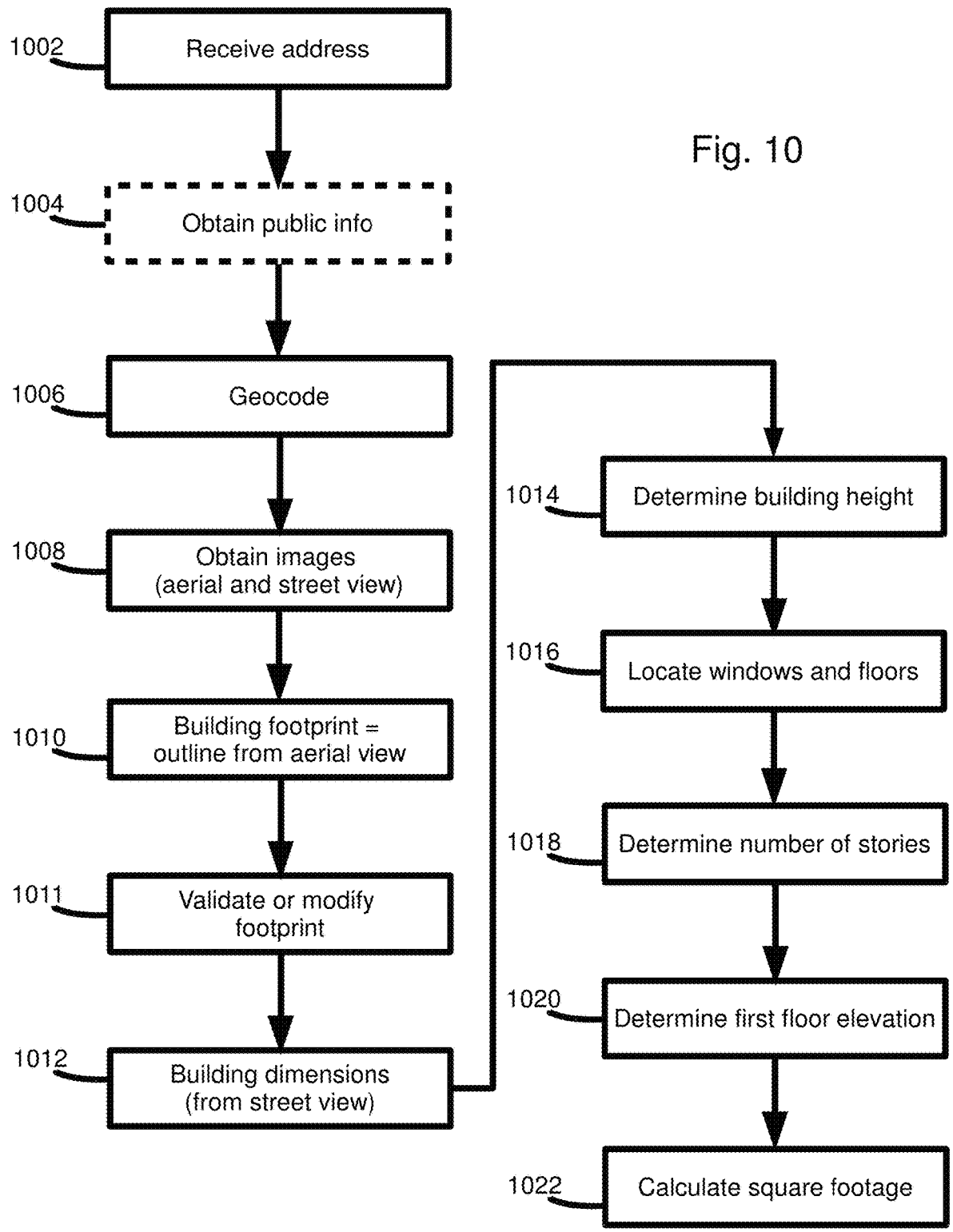
FIG. 10 is a flow chart illustrating a method for determining building square footage.

FIG. 10 illustrates a process 1000 for estimating square footage and number of stories for a building structure using a trained machine learning model. In step 1002, the building address is received. Publicly available information about the building structure and land parcel can be retrieved from known databases (Open Street Map, county databases, etc.) in optional step 1004 and stored for cross-referencing. The building is geocoded to obtain a longitude/latitude data pair in step 1006. Imagery for the geocoded location (both aerial and street view imagery) is obtained in step 1008. The aerial imagery is used to establish the building boundaries or footprint in step 1010.

In step 1011, the building footprint is validated by cross-referencing to external data, for example, as retrieved from government databases or other publicly available sources in step 1004. In some cases, the building footprint may cover more than one real property parcel; or the footprint may need to be split to define one or more discrete portions of interest in the entire footprint based, for example, on business ownership data. A strip mall is one example where multiple tenants or owners may have discrete rights in only a portion of the entire building structure.

The street view imagery in then used in step 1012 to establish the building dimensions. The building height is determined in step 1014. A simple approach uses trigonometry: x is the distance from the street view camera to the building; y is the height of the building in pixels; since the direction of the photo image is known from the known street view camera position, the angle can be readily determined; given the angle and distance, the height of the building can be calculated. However, this straightforward calculation often leads to a low accuracy result. A combination of approaches provides better accuracy. For example, from a street view photo, determine which pixels belong to the building, then aggregate that same information across several street view photos from several providers. From a satellite image, the size of the shadow can be compared with sun position and used to calculate building height. An off-nadir satellite image, i.e., satellite image taken at an angle, or an oblique aerial image (45 degree angle), with a view of the building façade, can also be used to estimate building height. When comparing different perspective images, key points can be matched across the different perspectives in order to make height calculations and also for creating a three dimensional model.

The location of all windows and the lines between floors is predicted using a segmentation model in step 1016. The lines between floors are also used to calculate the average floor height.

The number of stories in the building is determined in step 1018. For smaller buildings, a classification model is trained to assign a score for the type of building and then determine number of stories based on the scoring.

For larger buildings, the windows and floor lines can be counted from street view images to delineate each story. An alternative method uses floor height to calculate the number of stories if the top or back of the building is not visible, but height is known. In that case, the number of stories is equal to the building height divided by the average floor height.

The outline of the building and the lines of each floor are readily discernible from street view imaging, and thus, in step 1020, the first floor elevation is determined by using the building height calculation for one floor only. Often, particularly in commercial buildings, the first floor height is greater than the height of all other floors. In such cases, the height of the first floor and the height of subsequent floors is used to determine the number of floors.

Finally, in step 1022, building square footage is determined. In its most simple form, the square footage can be calculated as the number of stories times the footprint area. However, some buildings have complex, irregular shapes. In such cases, three-dimensional modeling can be used to calculate dimensions for individual portions then summed to a total. It should also be noted that square footage determined based on exterior dimensions do not reflect details like interior walls. Thus, a multiplier can be applied to reduce the square footage calculation based on other attributes, such as occupancy or occupancy type (factories have less interior walls than offices), or construction type (masonry walls are thicker than wood walls).

Additional processing may be performed by cross-referencing the estimated square footage calculated by the model against all available attributes from public databases and other external sources.

Figure 11:
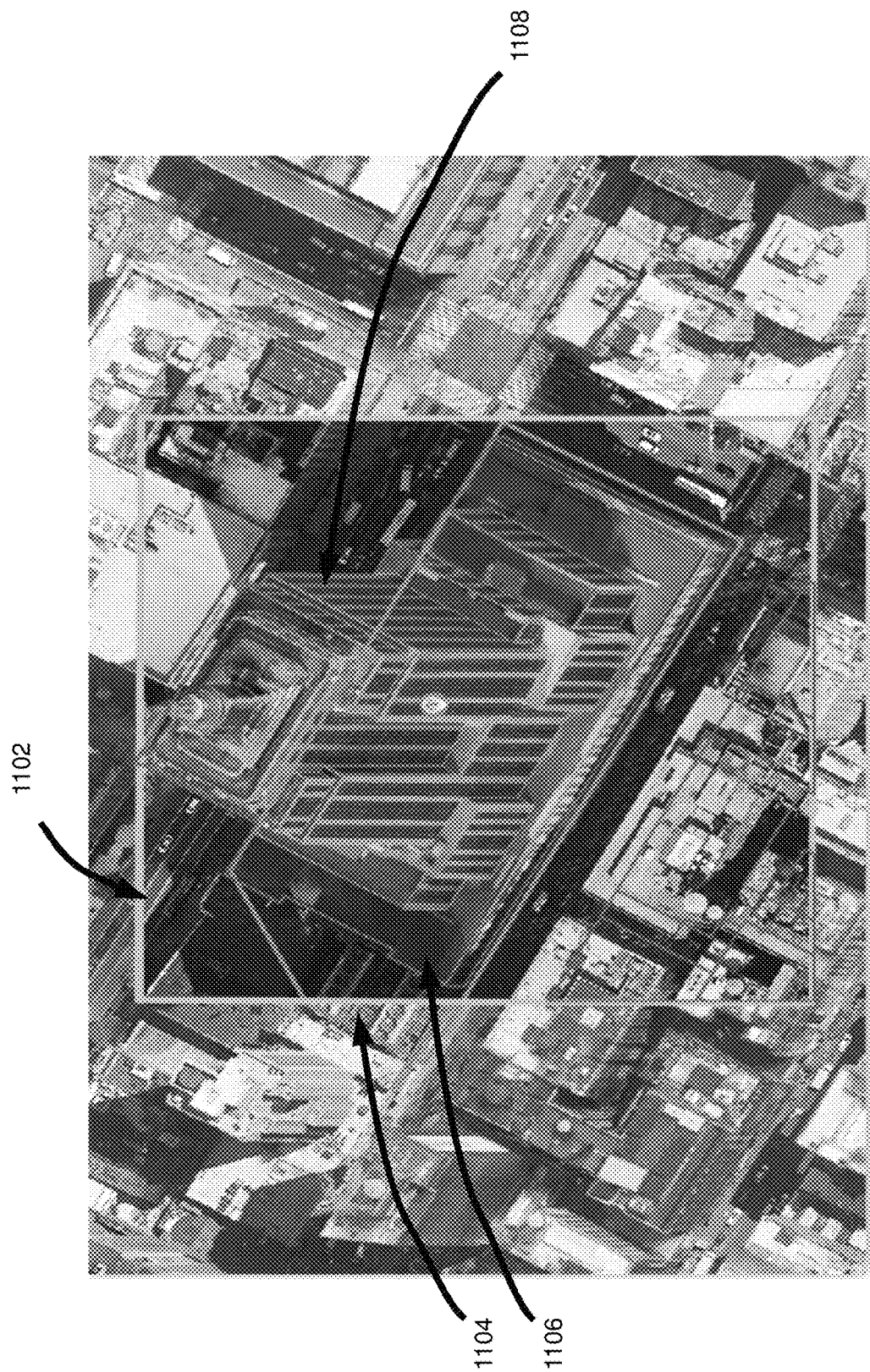
FIG. 11 is an overhead image and a depiction of a three-dimensional building model generated from the overhead image.

FIG. 11 illustrates an overhead image of a city environment approximately centered on a geolocation represented by boxed area 1102. The geolocation corresponds to the address of a tall office building located on a first real estate parcel. The metes and bounds that describe the legal boundaries of the first parcel are publicly available information that can usually be readily obtained from public databases or subscription services and can be used to draw the boundary line 1104. The effective footprint 1106 of the building structure can be derived from the original overhead image or the three-dimensional building model. Finally, the three-dimensional DSM of the building structure is shown by outline 1108, which includes both plan and elevational details of the structure, as derived from the overhead image data, thereby allowing a fairly accurate initial calculation of building square footage to be determined, which may be adequate for some purposes.

Figure 12:
FIG. 12 is a street view image and a depiction of highlighted building features generated from the street view image.

FIG. 12 illustrates a street view image showing several building with floors and windows demarcated on the image.

Of course, additional information can be used to enhance the accuracy of any estimates or calculations. First and foremost, the location of the parcel contributes significantly to any valuation or cost estimates. Further, additional data for any of the COPE factors can be useful. However, external data sometimes presents problems with inconsistency, age and missing data. External data sources may be scored, e.g., as to quality, or estimated age. The system thus learns when it is appropriate to use a particular external data source.

The foregoing description has been presented for the purpose of illustration and description. It is not intended to be exhaustive or to limit the disclosure to the precise form disclosed. Many modifications and variations are possible in light of the above teachings. It is intended that the scope not be limited by this detailed description, but by the claims and the equivalents to the claims appended hereto.

The invention claimed is:

1. A method for determining attributes of a first building located on a parcel of real property implemented by a server, the method comprising the steps of:
   obtaining a first image of the first building located on the property from an overhead view perspective relative to the first parcel and saving the first image on a storage accessible by the server;
   a computer-based model determining a first attribute of the first building from the first image;
   obtaining a second image of the first building from a street view perspective relative to the first parcel and saving the second image on the storage accessible by the server;
   the computer-based model determining a second attribute for the first building from analysis of the first and second images; and
   the computer-based model determining a third attribute of the first building;
   wherein the computer-based model comprises artificial intelligence trained on sample data sets including a lookup table with details of attributes.

2. The method of claim 1, wherein the first attribute is a footprint of the building, the second attribute is a plurality of dimensions of the building, and the third attribute is a square footage of the building.

3. The method of claim 1, further comprising the step of:
the computer-based model generating attribute data associated with the first building;
wherein the attribute data is selected from the group consisting of: construction data, occupancy data, protection data and exposure data.

4. A method for determining attributes of a building located on the property comprising the steps of:
obtaining a first image of a first building located on the property from an overhead view perspective relative to the first parcel and saving that first image on a storage accessible by a computer;
analyzing the first image with a first software model on the computer that is configured to identify buildings or objects from an overhead perspective;
obtaining a second image of the first building from a non-overhead view perspective relative to the first parcel and saving the second image on the storage accessible by the computer;
analyzing the second image with a second software model on the computer that is configured to identify buildings or objects identified with the first software model;
analyzing the results of the first and second software models with a third software model that evaluates the different views of the images and generates attribute data associated with the building or objects;
wherein the attribute data is selected from the group consisting of: construction data, occupancy data, protection data and exposure data.

5. The method of claim 4, wherein the construction data comprises data relating to the materials from which the building is made.

6. The method of claim 4, wherein the occupancy data comprises data relating to the purpose for which the property is used.

7. The method of claim 4, wherein the protection data comprises data relating to methods used to safeguard the building.

8. The method of claim 4, wherein the exposure data comprises data relating to external hazards to the building that exist due to the location of the building.

9. The method of claim 4, further comprising the steps of:
transmitting property identification information to the computer from a user computer to identify the property;
gathering the attribute data associated with the identified property; and
generating a property report based on the property identification and the gathered attribute data associated with the property.

10. The method of claim 9, wherein the report is generated as part of a graphical user interface including at least some data associated with the images that is graphically displayed on a user device.

11. The method of claim 10, further comprising the step of annotating the data associated with the images, the annotations relating to the attribute data.

12. The method of claim 9, wherein the report includes features of the property selected from the group consisting of: geographic location of the property, geographic location of a building on the property, geographic location of objects on the property, a footprint of a building on the property, a square footage of a building on the property, construction materials used for a building on the property, a number of stories of a building on the property, a replacement value or reconstruction cost for a building on the property, an occupancy type for the property, a location of trees and vegetation on the property, emergency resources on the property, and combinations thereof.

13. The method of claim 4, wherein the non-overhead view perspective comprises a street view perspective.

14. The method of claim 4, further comprising the steps of:
generating a three dimensional model from the first and second images to represent elevation and surface definition information for a building or objects identified on the property.

15. The method of claim 4, wherein the first software model and the second software model comprise artificial intelligence trained on sample data sets.

16. The method of claim 15, wherein the artificial intelligence resides on cloud-based servers such that the steps of analyzing the first image, analyzing the second image and analyzing the results of the first and second software models occur via cloud-based processing.

17. The method of claim 4, further comprising the steps of:
accessing a lookup table including details of objects and attributes; and
comparing details in the first image and details in the second image to details in the lookup table to correlate and identify the details in the first and second images.

18. The method of claim 1, wherein the artificial intelligence comprises machine learning models.

19. The method of claim 15, wherein the artificial intelligence comprises machine learning models.

* * * * *